Dec. 14, 1926.  
W. H. GASTON, JR  
1,610,439  
AUTOMATIC APPARATUS FOR APPLYING NONSKID CHAINS  
Filed Oct. 7, 1924  
6 Sheets-Sheet 1
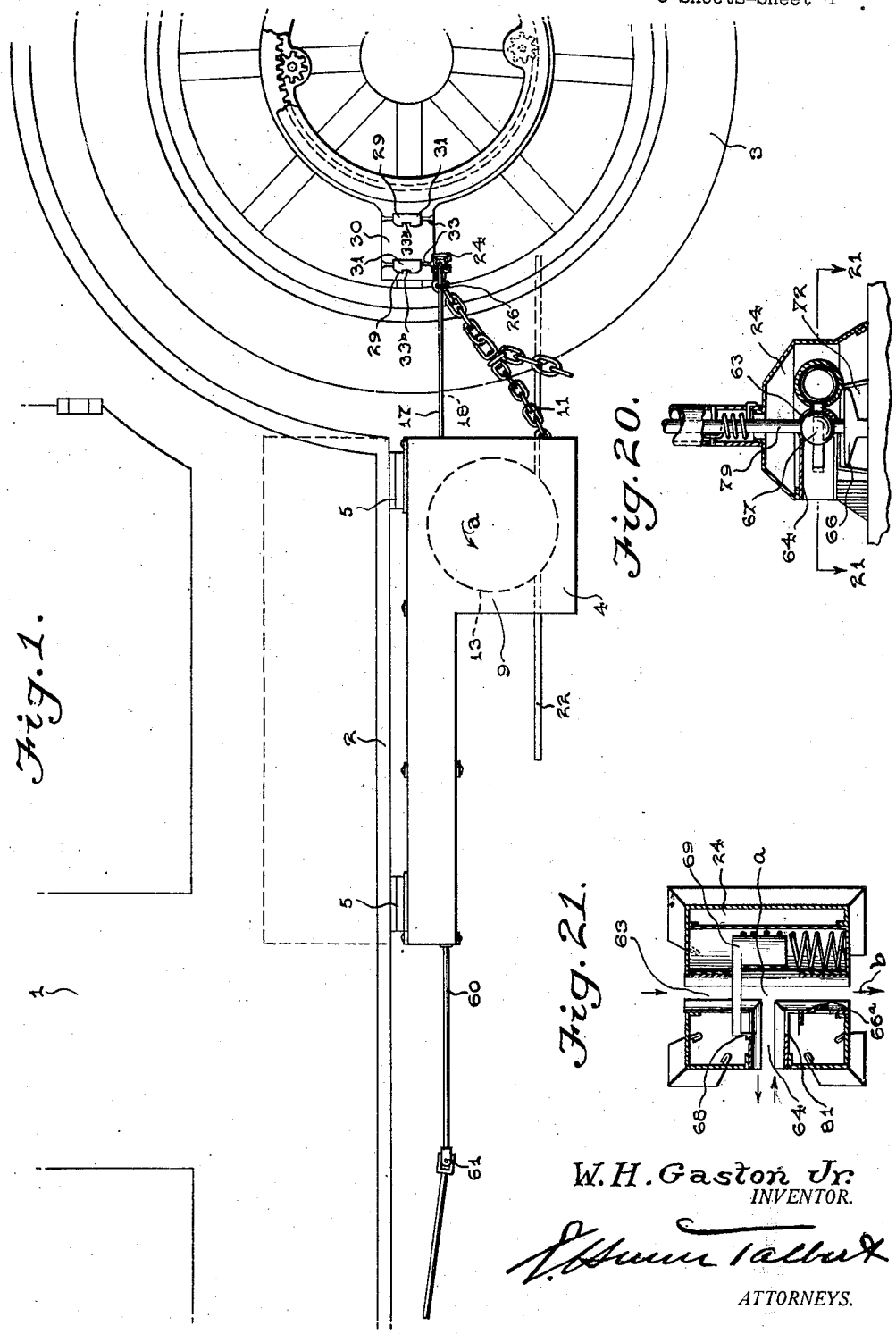
W. H. Gaston Jr.
*INVENTOR.*
*ATTORNEYS.*

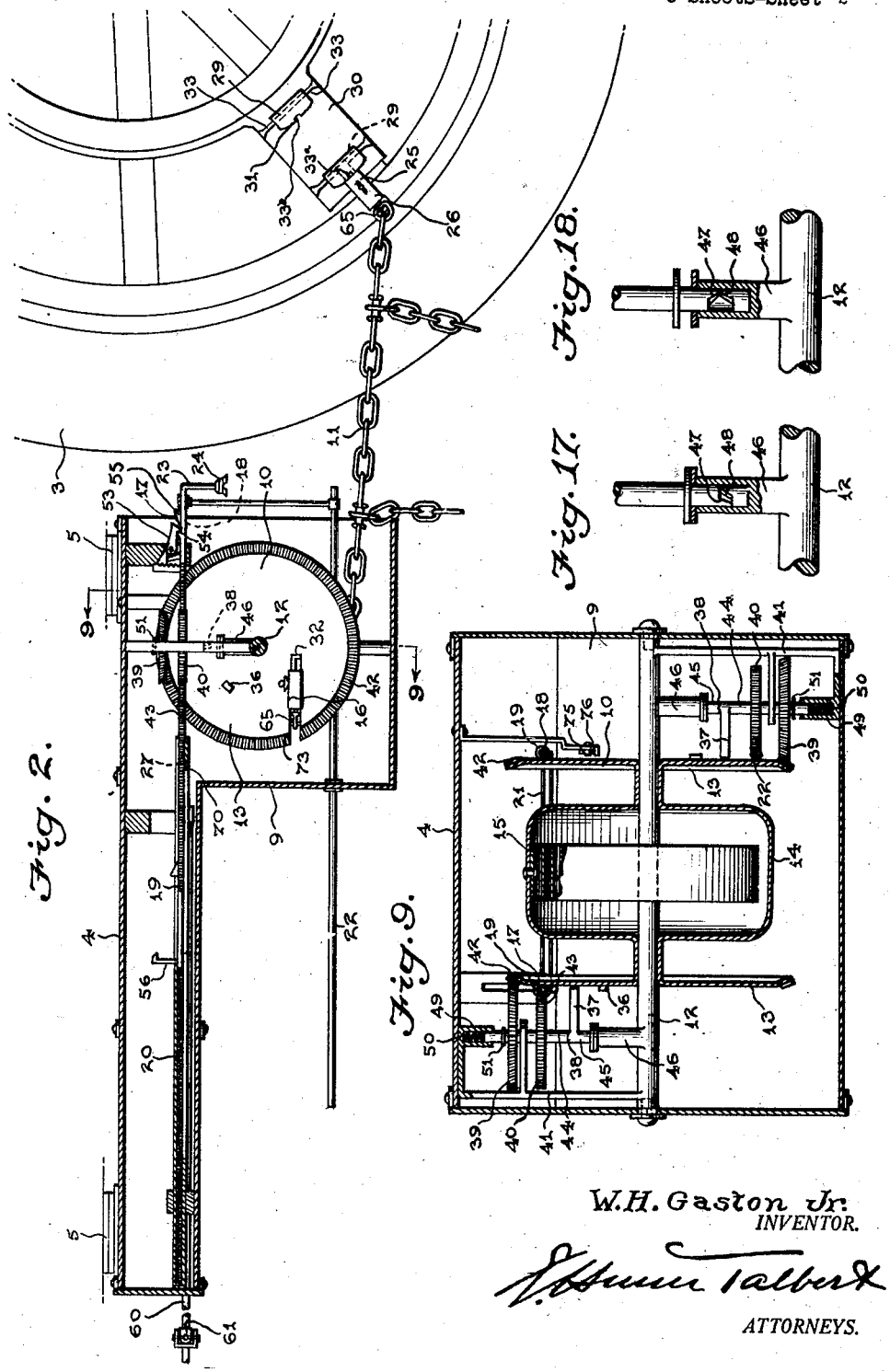

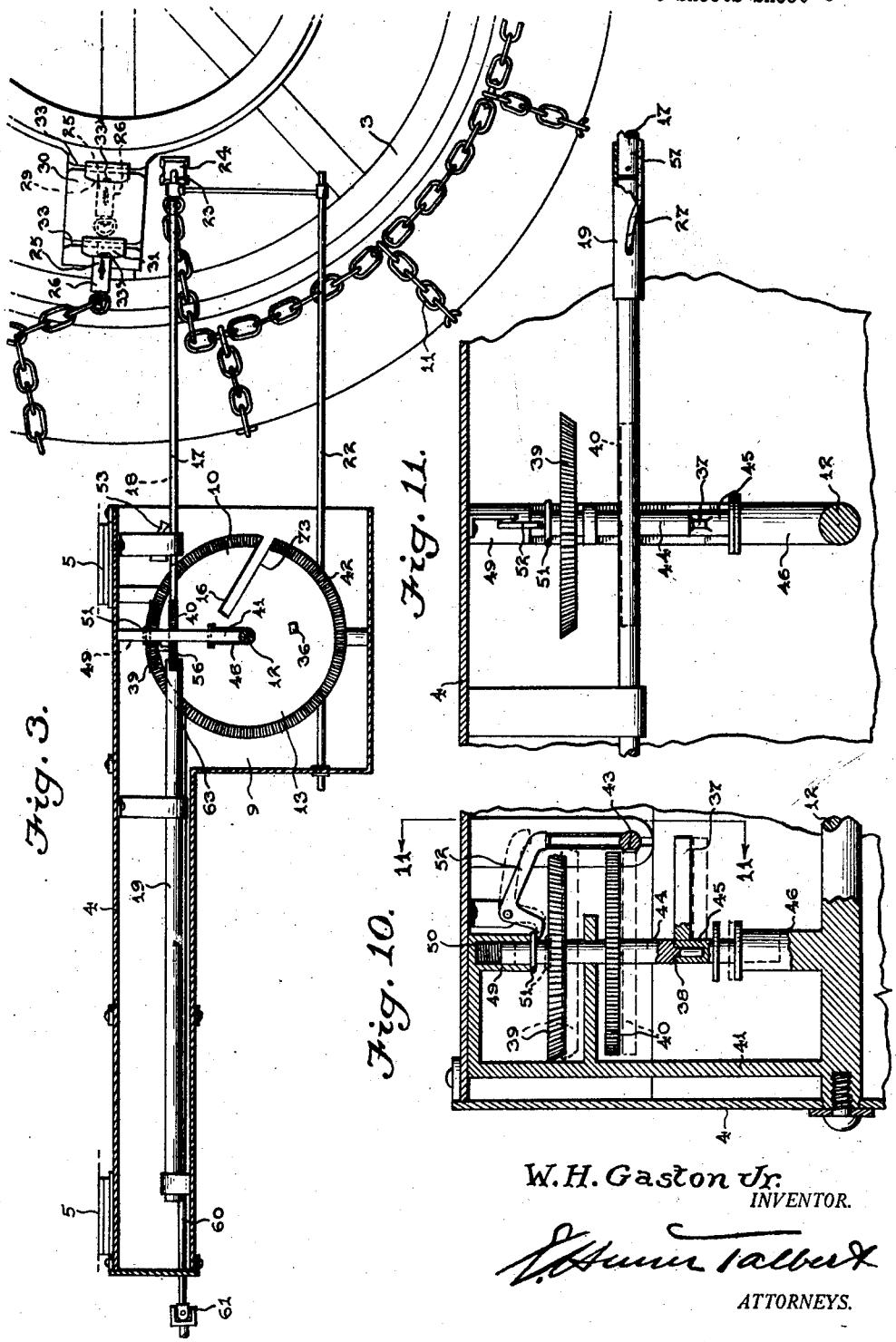

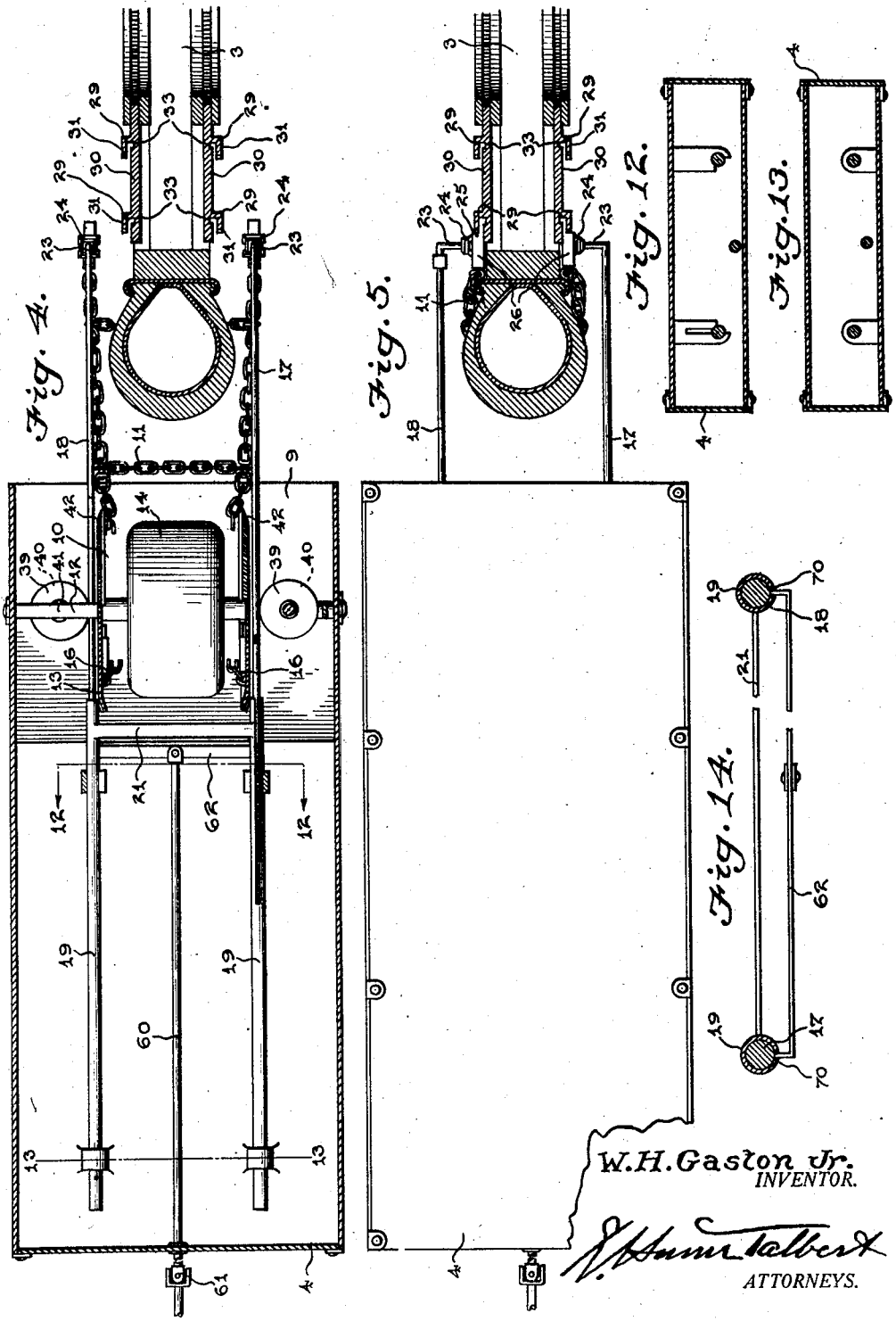

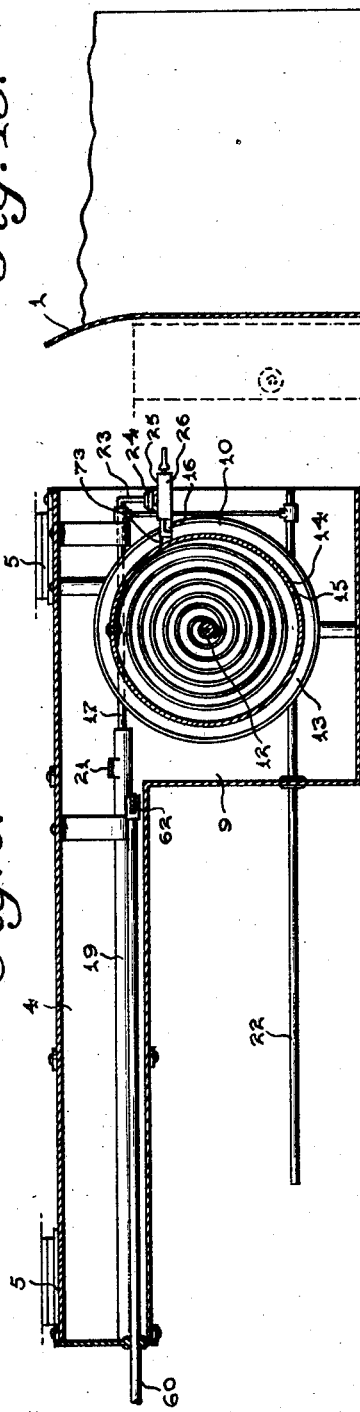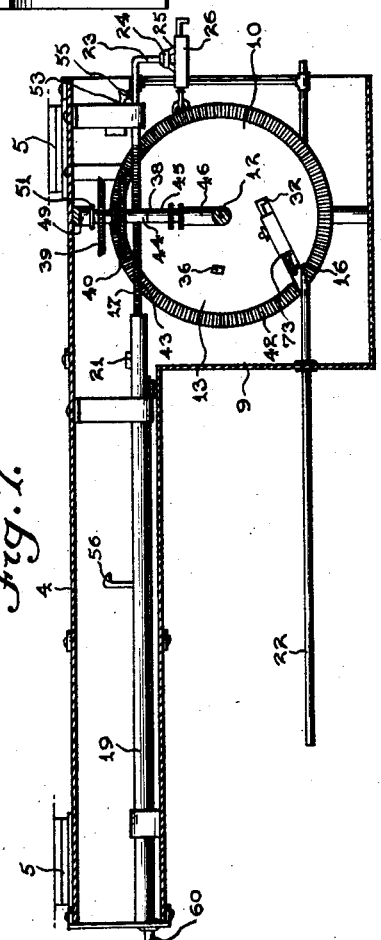

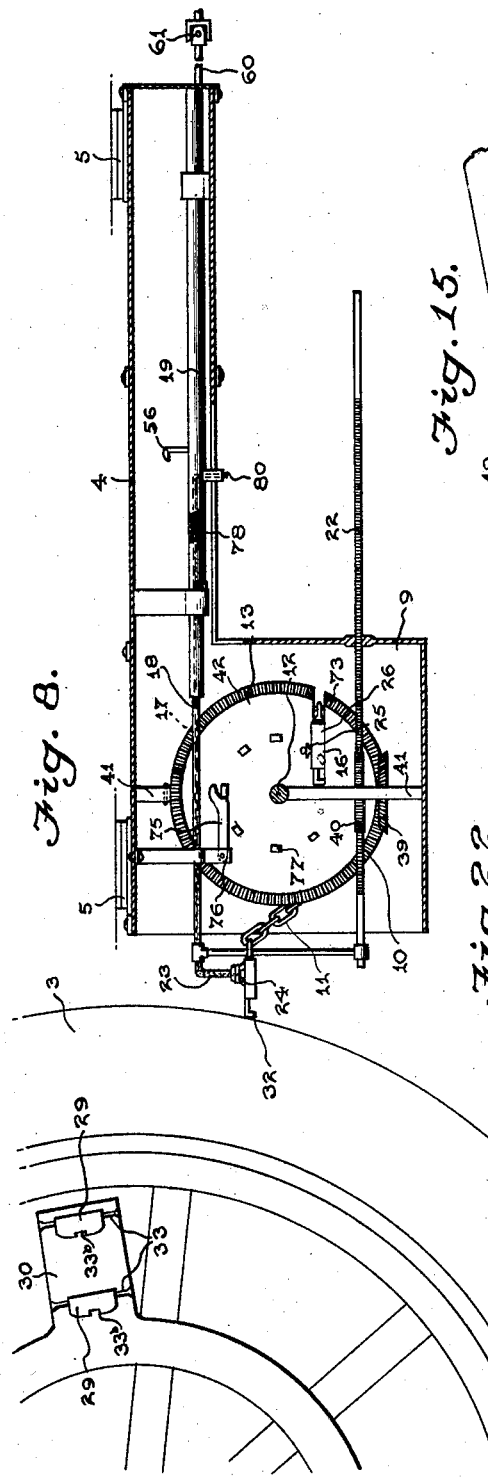

Patented Dec. 14, 1926.

1,610,439

UNITED STATES PATENT OFFICE.

WILLIAM H. GASTON, JR., OF MADISON, WISCONSIN.

AUTOMATIC APPARATUS FOR APPLYING NONSKID CHAINS.

Application filed October 7, 1924. Serial No. 742,208.

It is the purpose of the present invention to provide, in an automatic apparatus for applying non-skid chains on the drive wheels of an automobile, a construction which can be easily carried under the running board of the automobile, in conjunction with means at the driver's seat and operatively connected with the apparatus for applying and removing the chains to and from the wheels.

Another purpose is to provide means to unreel non-skid chains and carry their ends rearwardly whereby they may be attached to the drive wheels and then carry the opposite ends of the chains to the wheels to complete the application of the non-skid chains upon the drive wheels.

Still another purpose is the provision of means for causing the non-skid chains to re-reel as they are automatically removed from the drive wheels during their forward action and in such a manner as to avoid any interference by the sides of the tire and the rim.

A further purpose is the provision of means for automatically attaching and detaching the ends of the non-skid chains to and from the wheels.

A still further purpose is the provision of means carried by the drive wheels to which the opposite ends of the chains may be detachably connected.

The invention further aims to provide, in an apparatus for automatically applying non-skid chains to drive wheels of automobiles, a reel construction from which the non-skid chain can be reeled and disconnected, in conjunction with means carried by the reel and put under tension as the non-skid chain is removed from the reel, so as to cause the chain to rewind on the reel.

The invention also aims to provide means to prevent twisting of the side chains of the non-skid chain armor during the application and removal of the same to and from the drive wheels of an automobile.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of the rear portion of an automobile, showing the improved apparatus applied.

Figure 2 is a longitudinal sectional view through the same.

Figure 3 is an elevational view partly in section showing the apparatus as having been operated and in the act of completing the attachment of the armor to one of the rear drive wheels.

Figure 4 is a top plan view of Figure 3 with a part of the housing in section and the wheel rim and tire in section.

Figure 5 is a top plan view showing the wheel rim and tire in section.

Figure 6 is a longitudinal sectional view with the drum in section.

Figure 7 is a view showing one end of the reel with the gears 39 and 40 out of engagement with the teeth of the reel and those of the rods 17 and 18.

Figure 8 is a view in elevation of the opposite side of the apparatus, the housing of which is partly in section.

Figure 9 is a sectional view on line 9—9 of Figure 2.

Figure 10 is an enlarged sectional view of the upper left hand side of Figure 9, more clearly showing the construction and mounting of the gears 39 and 40.

Figure 11 is a sectional view on line 11—11 of Figure 10.

Figure 12 is a sectional view on line 12—12 of Figure 4.

Figure 13 is a sectional view on line 13—13 of Figure 4.

Figure 14 is a cross section of the tubular guides for the rods 17 and 18.

Figure 15 is a detail perspective of one of the guide tubes 19, showing the spiral slot 27 and lug 28.

Figure 16 is a sectional view of one of the tubular rods 19, showing the swivel joint.

Figure 17 is a detail view of the tubular support 46, showing the inclined cam faces 47 and 48.

Figure 18 is a detail view of the tubular support 46, showing another position of the inclined cam faces 47 and 48.

Figure 19 is a detail view showing how the housing with the mechanism therein is mounted on the running board for adjustment to either one of the two positions shown.

Figure 20 is a detail sectional view of the chain armor attaching shoe.

Figure 21 is a sectional view on line 21—21 of Figure 20.

Figure 22 is a detail sectional view of one of the attaching links of the chain armor.

Figure 23 is a plan view of Figure 22.

Referring to the drawings, 1 designates a portion of an automobile, 2 the running board and 3 one of the rear wheels, and 4 denotes a housing hingedly supported at 5 which, in connection with suitable means (not shown) may be moved from a normal position under the body of the automobile to a position under the running board in front of the rear wheels.

The housing is of the general shape shown, and mounted in the larger portion 9 thereof is a suitable reeling mechanism 10 for carrying the non-skid chain 11. It is understood that each running board is provided with a housing of the character illustrated, therefore each housing carries a reeling mechanism. However, only one housing including a reeling mechanism is illustrated.

The reeling mechanism comprises a shaft 12 fixedly mounted in bearings transversely of the housing and rotatably mounted upon the shaft is a reel 13 including a drum 14. The interior of the drum has a main spring 15, one end of which is connected to the wall of the drum, the other end to the shaft 12 so that when the reel with its drum is operated for the purpose of advancing the non-skid chains rearwardly toward the rear drive wheel 3, the main spring is put under tension so that the reel and drum will act to re-reel the non-skid chain upon the reel.

The ends of the side chains of the non-skid armor are detachably connected at 16 to the end disks of the reel. In fact, both ends of the side chains of the non-skid armor are connected to the reel. In order to advance the non-skid chain rearwardly toward the rear drive wheel, suitable rods 17 and 18 are provided. These rods are mounted in tubular guides 19 and are disposed normally for the purpose of putting coil springs 20 (which are mounted in the tubular guides 19) under tension. The rods 17 and 18 are mounted to operate on opposite sides of each of the rear wheels, that is, when advancing the non-skid chain or armor toward the rear wheel.

The tubular guides 19 are connected by a transverse bar 21. An additional rod 22 is provided below the rod 17 and connected thereto for movement therewith. The rear ends of the rods 17 and 18 have depending arms 23, the terminals of which are provided with chain armor attaching shoes 24. These chain armor attaching shoes connect with the locking terminals 25 of the swivel links 26 at the ends of the side chains of the non-skid armor so as to unwind the armor from the reel and carry the same toward the rear wheel.

When the housing is positioned below the running board, the rods 17 and 18 are then released and due to the action of the coil springs 20 in the tubular guides 19, the rods are advanced rearwardly. When the rods are advanced rearwardly, the arms 23 are in depending positions. However, as soon as the rods 17 and 18 reach the limit of their rearwardly advanced positions, the rods 17 and 18 are given a quarter turn to dispose the arms 23 in positions extending toward each other, that is, extending toward the side of the rear wheel. To accomplish this result, the tubular guides are provided with spiral slots 27 with which lugs 28 (which are carried by the rods 17 and 18) engage.

Obviously, as soon as the rods are about to reach the limit of their rearward movement, the coil springs 20 still exerting pressure upon the rods, the rods automatically receive a quarter turn due to the lugs 28 camming in the spiral slots 27. The arms 23, when so turned, have the locking terminals 25 of the swivel links 26 of the side chains of the non-skid armor in position to connect with the catches or keepers 29 which are carried by opposed plates 30 mounted upon the rear wheel, there being shields or guard plates 31 so disposed as to protect and retain the locking terminals in engagement with the catches or keepers. When the locking terminals are in the act of connecting with the keepers or catches, suitable lugs 32 of the terminals enter the slots or grooves 33 which are formed in the opposed plates 30 to insure holding the locking terminals in position. The shields or guards act to protect the terminals and at the same time to retain them in engagement with the catches or keepers.

As soon as the locking terminals are operatively connected to the catches or keepers, the rods 17 and 18 are returned to their normal positions, that is, moving in a forward direction.

The opposed plates 30 of the catches or keepers 29 are applied to the wheel, as in Figures 3, 4 and 5, in any suitable manner, preferably as forming a part of the brake drum of the rear wheel. The plates 30 of the keepers have grooves 33 on their remote faces positioned to receive the terminal links of the chain armor, there being spring tensioned detents 33ª to engage with the notches 33ᵇ in the guard plates or shields 31, thereby retaining the terminal links of the chain armor connected to the keepers. The detents 33ª have projecting pins 33ᶜ which may be moved against the action of the tensioning means of the detent to permit the detent to disengage from the notches 33ᵇ.

As previously stated, as soon as the locking terminals on the sides of the non-skid chain or armor are connected to the catches or keepers, the rods 17 and 18 move forwardly to their normal positions. However, a short period elapses between the time that the locking terminals are released from the chain armor attaching shoes 24 and attached to the catches or keepers and the time that the rods 17 and 18 start to return to their normal position. For instance, as soon as the locking terminals are connected to the keepers or catches of the opposed plates on the rear drive wheel, the automobile being in motion, the wheel rotates and carries the armor or non-skid chain with it. This initial movement then starts to move the reel and due to this movement a cam 36 on the side of one of the end disks of the reel cooperates with a projection or spur 37 on a moving shaft 38 (which is guided by a frame 41) for the purpose of raising gears 39 and 40.

The gear 39 is adapted for meshing with the gear teeth 42 on the side of one of the end disks of the reel while the gear 40 is designed for meshing with rack teeth 43 on the side of its respective rod 17. In fact, there are two vertically movable shafts 38, one adjacent one end of the reel near its upper portion, the other disposed at the opposite end of the reel adjacent its lower portion. It is to be understood that these gears 39 and 40 are not in mesh with the teeth 42 of the reel or the teeth 43 of the rods when the rods 17 and 18 receive their quarter turning. The meshing of the gears 39 and 40 with such teeth occurs immediately following the return of the arms 23 to their depending positions.

While the arms 23 are in the act of moving toward their depending positions, the cam 38 is advancing toward the projection or spur 37. The final raising of the shaft 38 and the meshing of the gears 39 and 40 with their respective teeth and the return of the arms 23 to their depending positions occur simultaneously. Therefore, as the rear wheel of the automobile continues its rolling movement for the purpose of applying the non-skid chain or armor, the reel is rotated and, since the teeth 42 mesh with the gear 39, the shaft 38 receives revoluble movement and due to this movement the gear 40 is rotated and since it is meshing with the rack teeth 43 of the rod, the rod is returned to its initial position against the action of the spring 20, so that the opposite locking terminals of the side chains of the non-skid armor may be detached from the reel to be advanced rearwardly and connected to the keepers or catches on the rear wheel.

Each of the shafts 38 is in two sections, the section 44 (which carries the gears) and the section 45. The section 45 carries the projection or spur 37 and is mounted in a tubular support 46 which is carried by the shaft 12. When the cam 38 cooperates with the projection or spur 37, the inclined faces 47 and 48 cooperate to assist in the vertical axial movement of the shaft 38. The inclined cam surface 48 is in the bottom of the tubular support 46 while the inclined cam surface 47 is a part of the lower end of the section 45. The upper end of the shaft 38 is guided in a tubular extension 49 of the frame 41 and is under tension of the coil spring 50. A collar 51 is carried by the shaft or rod 38 and is engaged by a catch 52 when the shaft 38 is raised.

When the rods 17 and 18 move forwardly after the chain armor attaching shoes have released the locking terminals and connected them to the catches or keepers, the rods are held in their forward positions by means of the dogs 53 engaging with notches 54 of the rods. The rods have cams 55 which engage with the dogs 53 to release them from the notches 54 to permit the rods to advance rearwardly to carry the other locking terminals of the side chains of the armor to and connect them with the keepers or catches on the plates 30. The spring catches 52 are released prior to the release of the dogs 53 by means of the projections 56 so that the shaft 38 may lower to its normal position to move the gears out of mesh with their respective teeth. In fact, the rods 17 and 18 have swivel sections 57 in order that the depending arms 23 may be disposed in positions extending toward each other without affecting the body sections of the rods. The swivel sections of the rods are connected to the main sections thereof, as at 58.

In first applying the chain armor, the rods 17 and 18 are actuated manually by any suitable means (not shown) adjacent the chauffeur's seat, said means to be connected to the rod 60 in Figure 4 and including a universal joint 61 to facilitate the movement. The rod 60 is connected to a bar 62 which connects the two rods 17 and 18 which, in turn, are guided in the tubular frame 19.

The chain armor attaching shoes 24, shown in detail in Figures 20 and 21, are of hollow construction and have guide channels 63 and 64, the latter merging into the former as shown. The terminal links 26 (which are swiveled at 65 to the side chains of the armor) have T heads 66 which enter the channels 63 and 64. The T heads have integral knobs 67.

Referring to Figure 7, the armor applying mechanism is normally in the position shown, with certain of the terminal links connected to the attaching shoes, the balls or knobs 67 being engaged in the channels or guides 63 and 64 at a point indicated by the letter $a$. As previously stated, the rods 17 and 18 are first manually actuated by the operating means (not shown) adjacent the chauffeur's seat to trip the dogs 53. The rods 17 and 18 move rearwardly, one on one side of each rear wheel, the other on the opposite side.

The operating means adjacent the chauffeur's seat may be of such construction as to move the rods 17 and 18 sufficiently to position the attaching shoes with the lugs 32 aligned in order to enter certain of the grooves 33, especially those remote from the center of the drive wheel. As soon as the lugs 32 enter certain of the grooves 33 and the detents 33$^a$ engage with the notches 33$^b$, the wheel being in motion will cause the T heads to pass out through the channels or guides 63 in the direction of the arrow $b$ in Figure 21. The knobs or balls 67 in disengaging from the channels 63 will depress the struck up spring 66$^a$, allowing the balls or knobs 67 to detach.

As the rear wheel is in motion, the chain armor will feed from the reel which is mounted in the housing 4 and during this period of operation, the rods 17 and 18 will move forwardly to their initial positions and will cease moving at the proper time to permit the knobs or balls 67 at the other ends of the side chains of the armor to enter the channels 64. The knobs or balls in entering the channels 64 will engage with the angular terminal 68 of a detent 69 which is mounted in a guide of the attaching shoe. This detent 69 is spring tensioned and since the detent is loosely mounted in a guide of the attaching shoe, the terminal of the arm of the detent will move to one side to allow the ball or knob 67 to position at the point $a$. The springs in the tubular frame 19 then act on the rods 17 and 18, and if necessary the chauffeur may assist in this operation through the operating means (not shown), the rods 17 and 18 again moving rearwardly with the other ends of the side chains of the armor.

It will be noted that the rods 17 and 18 must, on the second operation, move a greater distance in order to position the attaching shoes so that the lugs 32 will enter certain other of the grooves 33 of the opposed plates 30, that is, the grooves 33 nearest the center of the drive wheel. In order to move the rods 17 and 18 this greater distance, the operating means (not shown) may be of a character to move the entire tubular frame 19, and since the right angled ends of the bar 62 are in contact with the ends of the slots 70 of the tubular guides of the frame 19, the entire frame, together with the rods 17 and 18, may move the greater distance to position the lugs 32 of the terminal links in order that the lugs may enter the grooves 33 nearest the center of the rear wheel. As previously stated, it is obvious how the arms 23 on the rods 17 and 18 are moved to extend toward each other on opposite sides of the rear wheel of the automobile.

The rods 17 and 18, as long as they are received by the tubular sides of the tubular frame 19 against the action of the springs 20, are held in such positions by the dogs 53. However, the operating means at the chauffeur's seat may be of a construction whereby it may actuate to move the rods 17 and 18 a short distance forwardly, sufficiently to permit the cams 55 to lift the dogs 53, which will be held in such raised position by the spring detent 53$^a$ engaging with the serrations 53$^b$. When the rear ends of the rods 17 and 18 reach the limit of their movement to position the terminal links so that the lugs 32 will enter the grooves 33 remote from the center of the drive wheel, lugs 53$^c$ on the rods will engage with the arms 53$^d$ and move the dogs 53 downwardly against the rods 17 and 18, so that when the rods are moved back by the rear mechanism, the dogs will engage the different notches 54 and retard any tendency of the rods toward rearward movement.

In removing the chain armor, the rods 17 and 18 are moved rearwardly by the springs 20 assisted by the operating means (not shown) adjacent the chauffeur's seat, until the attaching shoes are positioned with the channels 63 in alignment to receive the balls or knobs 67, which will engage with the lateral arms of the detents 69, depressing them laterally. The balls or knobs in entering the channels 63 cause the T heads 66 to guide into the channels 72 of the attaching shoes. The pins 33$^c$ also enter the channels 72, depressing the detents 33$^a$ and removing their ends from the knob 33$^b$, then the rods 17 and 18 move forwardly, carrying with them the terminals of the chain armor and attaching the terminals or terminal links in the slots 73 of the end disks of the reel.

Due to the main spring 15 having been put under tension when removing the chain armor from the drum, the armor automatically reels upon the drum. By the time the greater portion of the armor chain has been reeled on the drum, the rods 17 and 18 can move rearwardly and detach the other terminal links from the grooves 33 nearest the center of the drive wheel in the same manner as the first terminal links were detached. The rods 17 and 18 can move forwardly and remain in the positions shown in Figure 7, with the terminal links connected to the attaching shoes. In connecting the terminal links in the slots 73, certain edges of the slots 73 engage in grooves 74 of the terminal links in order to attach the first removed ends of the chain armor to the reel.

A dog 75 is pivotally supported at 76 and is positioned to cooperate with the teeth 77 on one end of the reel to prevent retrogression of the reel when the main spring is put under tension. Mounted in the rod 17 (which is hollow) is a relatively stiff but flexible cable 78, one end 79 of which is positioned to be engaged by the knob or ball 67 actuated so as to dispose its other lateral end 80 in the path of the dog 75 to raise it out of engagement with the teeth 77 to permit the reel to rotate for rewinding the armor thereon.

When the detent 69 is depressed by the ball or knob, a catch 68 engages a shoulder 81 of one of the walls of the channel 64 to hold the detent depressed. However, the detent may be further depressed to allow the ball or knob to pass out through the channel 64 after attaching the terminal link in the slot 73.

In the operation, the housing is first moved from under the body of the automobile to a position under the running board and at the same time the rods 17 and 18 are advanced rearwardly, carrying the front ends of the non-skid chain or armor for the purpose of fastening its locking terminals to the catches or keepers. As soon as the rods reach their rearward positions, the lug 28 cooperates with the spiral or worm slot 27, causing the depending arms 23 to turn up and assume lateral positions projecting toward the opposite sides of the wheel in order that the chain ends may be taken from the chain armor attaching shoes and connected to the catches or keepers on the plates 30 on both sides of the drive wheel of the automobile.

The front locking terminals of the side chains of the chain armor having been fastened to the keepers or catches, the drive wheel 3 continues to revolve and the chain is slowly pulled off of the reel from the under side. The drive wheel 3 rolls on the chain and at the same time this is done, the main spring 15 upon the interior of the drum of the reel is being wound up, the reel and the drum moving in a forward direction away from the rear drive wheel 3, as indicated by the arrow $a$ in Figure 1. As the reel rotates in this direction, the gears 39 and 40 on the left side of the reel are operated and at the same time the gear wheel 40 is operating its respective rod rearwardly. When the rods 17 and 18 are first moved rearwardly, the lugs 28 on the rods operating in the spiral or worm slots, cause the attaching shoes 24 to turn down so they can pass the rim and tire of the wheel. In other words, as soon as the attaching shoes have released the locking terminals of the side chains of the armor, the rods are in the act of moving slightly forward, that is, tending to return to their normal forward positions and in doing so the lugs 28 operate in the spiral slots 27 to return the arms 23 again to their depending positions.

As the drive wheel 3 revolves with the locking terminals of the side chains fastened to the keepers or catches on the plates 30, the rods having been moved forwardly, the cam 55 operates or cams upon the gear wheel 39 moving the same upwardly so that the spring catch 52 may engage with the collar 51. At the same time the cam 55 disengages the dog 53 from the notch 54, permitting the rods 17 and 18 to advance rearwardly toward the rear drive wheel 3.

Just before the rods 17 and 18 are released, the attaching shoes 24 have taken hold of the opposite ends of the side chains of the armor so as to carry them rearwardly to the rear wheel. When this is accomplished, the lugs 28 again operate in the spiral slots to turn the arms 23 toward each other so as to be in a position to be taken by the catches or keepers on the plates.

When the first locking terminals of the side chains are advanced rearwardly to the rear wheel, they move no farther than to engage the keepers or catches but when the last locking terminals are advanced rearwardly by the springs 20, they are carried far enough to engage the other set of catches or keepers on the plates 30. In fact, each plate 30 carries two sets of keepers or catches. The same operation occurs when the chain is removed from the reel.

After the chain is attached to the drive wheel with all four ends fastened to the plates 30, the lever adjacent the driver's or chauffeur's seat is operated to return the housing to its normal position.

When the non-skid chain or armor is removed from the drive wheel, the housing is moved to a position under the running board. The rods are then advanced rearwardly. It is to be understood that the first locking terminals are removed prior to the last locking terminals, therefore the chain armor is reversible. When the chain armor is removed from the drive wheel 3 to the reel, the mechanical parts on the right side of the reel are in operation and the rod 22 assumes the operation performed by the rod 18, that is, when the chain armor is put upon the rear drive wheel. This is necessary as the reel is turned away from the drive wheel in the direction of the arrow $a$ when the chain armor is applied to the drive wheel and turned toward the drive wheel, that is, in the reverse direction, when the chain armor is removed.

The invention having been set forth, what is claimed is:

1. In an apparatus for applying non-skid chains, the combination with an automobile including a rear drive wheel, of a reeling mechanism for supporting a non-skid chain under the running board, means for operating said mechanism for advancing one end of the non-skid chain to the rear drive wheel, end attaching means for connecting the chain to the drive wheel, and a mechanism for returning said advancing means for carrying the other end of the non-skid chain to and attaching it to the drive wheel.

2. An apparatus for automatically applying non-skid chains to a drive wheel including a reeling mechanism for the non-skid chain, means for advancing one end of the chain toward the drive wheel, means for attaching said end, and means for returning said advancing means to advance the other end of the chain and attaching it to the drive wheel.

3. An apparatus for automatically applying and removing a non-skid chain to and from the drive wheel of an automobile, including a reeling mechanism, means for operating the same to advance the chain from the reeling mechanism to the drive wheel, means for re-reeling the chain from the drive wheel, and means for attaching the opposite ends of the non-skid chain to the drive wheel, said advancing means being releasable to return to its normal position whereby it may advance the opposite end of the chain to the drive wheel.

4. An apparatus for automatically applying and removing a non-skid chain to and from the drive wheel of an automobile, including a reeling mechanism, means for operating the same to advance the chain from the reeling mechanism to the drive wheel, means for re-reeling the chain from the drive wheel, means for attaching the opposite ends of the non-skid chain to the drive wheel, and means for automatically releasing the non-skid chain from the reeling mechanism, said advancing means being releasable to return to its normal position whereby it may advance the opposite end of the chain to the drive wheel.

5. An appartus for automatically applying armor chains to the drive wheels of an automobile, comprising an armor supporting reel including means operable to carry certain ends of the armor rearwardly, means for attaching said ends to the drive wheels of the automobile, and means for returning said carrying means to connect it to the other end of the armor, whereby said other ends may be attached to the drive wheels.

6. Apparatus for automatically applying armor chains to a drive wheel of an automobile comprising an armor supporting reel, rearwardly movable attaching means for conveying one terminal of the armor to and attaching it to the drive wheel, and means for returning said attaching means during the intervening interval to carry the remaining end of the armor to and connect it with the drive wheel.

7. Apparatus for automatically applying armor chains to a drive wheel of an automobile comprising an armor supporting reel, rearwardly movable attaching means for conveying one terminal of the armor to and attaching it to the drive wheel, and means for returning said attaching means during the intervening interval to carry the remaining end of the armor to and connect it with the drive wheel, said attaching means being terminally inwardly movable laterally at the end of its rearward movement.

8. Apparatus for automatically applying armor chains to a drive wheel of an automobile comprising an armor supporting reel, rearwardly movable attaching means for conveying one terminal of the armor to and attaching it to the drive wheel, and means for returning said attaching means during the intervening interval to carry the remaining end of the armor to and connect it with the drive wheel, said attaching means having terminal elements automatically movable laterally toward said drive wheel at the conclusion of the rearward movement of the attaching means.

9. Apparatus for automatically attaching armor chains to a drive wheel of an automobile comprising an armor supporting reel, armor attaching means bodily movable in a direction transverse to the axis of the reel, operative connections between the reel and the attaching means to effect initial movement of the armor, resilient means for effecting movement of the latter, and terminal members carried by the attaching means and successively engaging the extremities of the armor to advance them to the vehicle drive wheel.

10. Apparatus for applying armor chains to a drive wheel of an automobile comprising an armor supporting reel, armor attaching means movable in a direction at right angles to the axis of the reel and provided with terminal elements for successive engagement with the ends of the armor and connecting that with the drive wheel, resilient actuating means for the attaching means, automatically released operative connections between the attaching means and the reel for initially imparting movement to the latter, and manualy controlled means for restraining the operation of the attaching means.

11. Apparatus for applying armor chains to a drive wheel of an automobile comprising an armor supporting reel, armor attaching means movable in a direction at right angles to the axis of the reel and provided with terminal elements for successive engagement with the ends of the armor and connecting that with the drive wheel, resilient actuating means for the attaching means, automatically released operative connections between the attaching means and the reel for initially imparting movement to the latter, and manually controlled means for restraining the operation of the attaching means, the attaching means having terminal elements laterally movable toward and away from the drive wheel.

In testimony whereof he affixes his signature.

WILLIAM H. GASTON, Jr.